J. R. TORBERT.
GLOBE VALVE.
APPLICATION FILED FEB. 19, 1914.
1,115,256.
Patented Oct. 27, 1914.
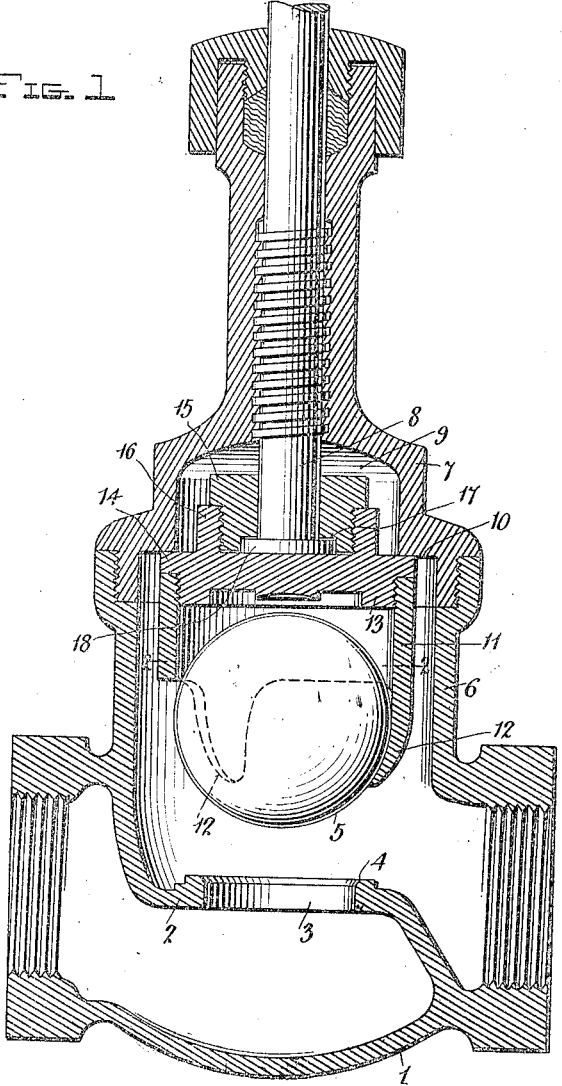
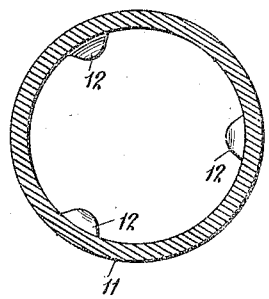
Witnesses
Inventor
James R. Torbert,
by
Attorney

UNITED STATES PATENT OFFICE.

JAMES R. TORBERT, OF WOODWARD, ALABAMA.

GLOBE-VALVE.

1,115,256.

Specification of Letters Patent. Patented Oct. 27, 1914.

Application filed February 13, 1914. Serial No. 819,793.

*To all whom it may concern:*

Be it known that I, JAMES R. TORBERT, a citizen of the United States, residing at Woodward, in the county of Jefferson and State of Alabama, have invented new and useful Improvements in Globe-Valves, of which the following is a specification.

This invention relates to improvements in globe valves of that general type wherein the valve member consists of a ball and is so organized relatively to the valve stem that it may be positively operated by said stem either to uncover or to close the opening which it controls; or, in a particular position of the stem, may function as a check valve, and may operate automatically in accordance with pressure conditions.

The principal object of the invention is to provide a construction of the type above described wherein the spherical valve member is supported in novel manner from the valve stem, the relation being such that said stem cannot produce any wear on said valve member.

An embodiment of the invention is illustrated in the accompanying drawings, wherein:—

Figure 1 is a vertical longitudinal sectional view of a valve in which the features of the invention are incorporated; and Fig. 2 is a detail horizontal sectional view on the line 2—2 of Fig. 1.

Similar characters of reference designate corresponding parts in both of the views.

The valve casing 1 is of usual construction and has the internal horizontal web 2 provided with the opening 3 which affords communication between the inlet and outlet sides of said casing. The wall of the opening 3 is formed to provide an annular seat 4 for a relatively heavy spherical valve member 5. The upper portion of the casing 1 is formed with a cylindrical neck 6 and the spherical valve member 5 and its appurtenances are arranged within the cylindrical portion 6. The cylindrical neck 6 is closed at its upper end by a head 7 which surrounds the valve stem 8 and is formed with threads companion to those on said stem. The head 7 is substantially bell-shaped at its base to provide an internal clearance 9 and below said clearance is formed with an annular shoulder 10.

The spherical valve member 5 is supported from the stem 8 through the intermediary of a cage which comprises a cylindrical body 11 having a gradually reduced or tapering, and preferably pronged, lower portion 12 against which the ball 6 fits when said ball is elevated from its seat; a head 13 formed with external threads to co-act with internal threads provided at the upper end of the body 11 and formed with a circumscribing shoulder 14 against which the body 11 may be turned; and a nut 15 which is secured in an internally threaded annular flange 16 projecting from the upper face of the head 13; the nut 15 surrounding the stem 8 and having its under face provided with a recess 17 to accommodate a flange 18 at the lower end of the stem 8; the flange 18 providing a swivel connection between the valve stem 8 and the cage which supports the ball 5. The cylindrical body 11 of the ball supporting cage is of such extent that the head 13 is somewhat distant from the ball 5 when the latter rests against the converging prongs 12. The space thus occurring between the head 13 and the ball 5 permits of a corresponding measure of loose play of said ball in its supporting cage, and by virtue of such loose play, the ball 5 may function as a check valve, providing an adjustment of the stem 8, suitable for this purpose, is made. When the ball 5 functions as a check valve it closes the opening 3 by gravity and is not positively held in closed position. In case it is desired to make the closure of the opening 3 positive, the stem 8 is turned to cause the head 13 to bear against the valve 5, the latter resting on its seat. When the head 13 engages the valve 5, said valve is positively held against its seat 4 and any movement of said valve from its seat is impossible until the stem 8 is again operated to provide for such movement. Since the head 13 has no turning movement relatively to the ball 5, it follows that the engagement of said head with said ball, in case the valve is to be positively closed against its seat, entails no appreciable wear upon the valve, and, therefore, does not interfere with the uniform sphericity of the latter. In case the ball 5 is to be positively supported at a distance from its seat, the stem 8 is turned to move upwardly and to carry the ball supporting cage therewith, said cage ultimately, through the intermediary of the tapering portion 12, lifting the ball 5 from its seat. The upward movement of the stem is limited by the engagement of the shoulder 14 of the ball supporting cage against the shoulder 10 of the head 7. The recess 9 of said head accommodates the flange 16 and nut 15 when the ball supporting cage is in its uppermost position. In case it should be necessary to renew the ball, ready access may be had thereto by removing the body 11 from the head 13. The removal of the body 11 from said head does not, however, interfere with the relation between said head and the stem 8. Therefore, the renewal of the valve is a very simple matter.

Having fully described my invention, I claim:—

A globe valve comprising a casing having a horizontal web provided with an opening therethrough and having a cylindrical neck above said web, a head forming a closure for said neck and having its lower portion bell-shaped to provide an internal clearance alining with said neck and having an internal shoulder circumscribing said clearance, a valve stem threaded through said head, a ball valve member controlling the opening in said web and a supporting cage for said valve member comprising a cylindrical body arranged within the neck of the casing and having a reduced lower portion against which the ball valve member rests in an elevated position of said cage, a head carrying said cylindrical body and having a concentric depending flange of reduced diameter upon which the cylindrical body is threaded, said body at its upper end abutting the marginal portion of said last named head and the said marginal portion in the uppermost position of said head engaging against the internal shoulder of said first-named head, said last-named head also having at its upper side an internally threaded circular concentric flange of less diameter than the clearance of said first-named head, and a nut secured within said last-named flange and surrounding said valve stem, the valve stem having at its lower end a circumscribing flange which fits between said nut and the head of said cage and provides a swivel joint between said stem and said cage, the body of the cage being of such length that the head of said cage is substantially spaced from the ball valve in an elevated position of the cage.

In testimony whereof I have hereunto set my hand in presence of two subscribing witnesses

JAMES R. TORBERT.

Witnesses:
J W. MOTLEY,
J. T. HEARD.